US011041480B2

(12) United States Patent
Miranda et al.

(10) Patent No.: US 11,041,480 B2
(45) Date of Patent: Jun. 22, 2021

(54) WIND TURBINE SYSTEM WITH DAMPING DURING SERVICE

(71) Applicant: VESTAS WIND SYSTEMS A/S, Aarhus N (DK)

(72) Inventors: Erik Carl Lehnskov Miranda, Randers (DK); Claus Thyge Pedersen, Lystrup (DK); Jacob Brøchner, Horsens (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 317 days.

(21) Appl. No.: 16/303,866

(22) PCT Filed: May 24, 2017

(86) PCT No.: PCT/EP2017/062596
§ 371 (c)(1),
(2) Date: Nov. 21, 2018

(87) PCT Pub. No.: WO2017/202944
PCT Pub. Date: Nov. 30, 2017

(65) Prior Publication Data
US 2020/0318612 A1 Oct. 8, 2020

(30) Foreign Application Priority Data
May 26, 2016 (DK) .............................. PA201670357

(51) Int. Cl.
*F03D 7/02* (2006.01)
*F03D 80/50* (2016.01)
*F03D 1/02* (2006.01)

(52) U.S. Cl.
CPC ............. *F03D 7/0296* (2013.01); *F03D 1/02* (2013.01); *F03D 7/0224* (2013.01);
(Continued)

(58) Field of Classification Search
None
See application file for complete search history.

(56) References Cited

U.S. PATENT DOCUMENTS 6,749,399 B2 * 6/2004 Heronemus ............. F03D 13/20
416/41
8,496,428 B2 * 7/2013 Richards ............... F03D 1/0608
415/4.3
(Continued)

FOREIGN PATENT DOCUMENTS

CN 101535634 A 9/2009
CN 102032110 A 4/2011
(Continued)

OTHER PUBLICATIONS

Chinese Office Action for Application No. 201780046256.8 dated Nov. 1, 2019.
(Continued)

*Primary Examiner* — Michael Lebentritt
*Assistant Examiner* — Jason G Davis
(74) *Attorney, Agent, or Firm* — Patterson + Sheridan, LLP

(57) ABSTRACT

The invention relates to a wind turbine system comprising a support structure with a plurality of wind turbine modules mounted to the support structure. A control system is arranged to enter a service mode wherein service can be performed in the wind turbine system by applying a first control command to a first subset of wind turbine modules for terminating power production. A second control command is applied to a second subset of wind turbine modules for bringing the second subset of wind turbine modules into an damping mode where each of the wind turbine modules of the second subset is operated and/or positioned to damp
(Continued)

vibrations, actively and/or passively, of at least one wind turbine module of the first subset of wind turbine modules.

16 Claims, 10 Drawing Sheets

(52) U.S. Cl.
CPC ........... *F03D 7/0272* (2013.01); *F03D 80/50* (2016.05); *F05B 2260/964* (2013.01)

(56) References Cited

U.S. PATENT DOCUMENTS

| | | | |
|---|---|---|---|
| 2003/0168864 A1 | 9/2003 | Heronemus et al. | |
| 2007/0138021 A1* | 6/2007 | Nicholson | B63H 19/00 205/628 |
| 2007/0176428 A1* | 8/2007 | Nagao | F03D 7/042 290/44 |

FOREIGN PATENT DOCUMENTS

| | | |
|---|---|---|
| FR | 2868483 A1 | 10/2005 |
| GB | 2443886 A | 5/2008 |
| JP | 2005351087 A | 12/2005 |
| WO | 2010098813 A1 | 9/2010 |
| WO | 2016023556 A1 | 2/2016 |
| WO | 2017202944 A1 | 11/2017 |

OTHER PUBLICATIONS

PCT Written Opinion of the International Searching Authority for Application No. PCT/EP2017/062596.

PCT International Search Report for Application PCT/EP2017/062596 dated Aug. 31, 2017.

Danish Patent and Trademark office First Technical Examinatoin of Patent Application No. PA 2016 70357 dated Nov. 30, 2016.

* cited by examiner

WIND TURBINE SYSTEM WITH DAMPING DURING SERVICE

FIELD OF THE INVENTION

The present invention relates to a wind turbine system, more particularly a wind turbine system with a plurality of wind turbine modules, the wind turbine system with multiple rotors having a service mode wherein damping is performed, actively and/or passively. The invention also relates to a corresponding method, and a corresponding computer program product and control system.

BACKGROUND OF THE INVENTION

The most common type of wind turbine is the three-bladed upwind horizontal-axis wind turbine (abbreviated HAWT). In this type of wind turbine, or wind turbine generator, the rotor with the corresponding blades is positioned at the front of a nacelle, the nacelle itself being mounted on top of a vertical wind turbine tower.

Alternatively, a wind turbine system with a plurality of wind turbine modules can be mounted to a support structure, for example with only a single tower supporting several wind turbine modules, the wind turbine modules can be mounted in several different layers in the vertical direction. Wind turbine systems of this kind are also known in the field as multi-rotor array-type wind turbines. These wind turbine systems have several advantages, in particular in connection with transport, upscaling, and flexibility compared to conventional HAWTs.

However, such wind turbine systems also have some disadvantages, in particular the mechanical stability will be more difficult to handle, for example because the wind turbine modules may interact with each other. The concept of multi-rotor array-type wind turbines has been known for some time, but the associated problems have unfortunately been a barrier for implementation on any significant commercial scale in the wind turbine industry.

It is expected that particularly during service of such multi rotor wind turbine systems, the stability problems normally experienced on a conventional single rotor wind turbine will actually be worse for a multi rotor wind turbine systems.

Thus, the safety and stability requirements during service for multi rotor wind turbine systems could be even more strict than hitherto for conventional single rotor wind turbines, thus representing yet another barrier for the wider commercial use of multi rotor wind turbine systems. For example, at a level of low wind where service is possible for conventional single rotor wind turbines, it may be difficult or impossible to perform service of multi rotor wind turbine systems under the same wind conditions.

Hence, an improved wind turbine system with multiple rotors would be advantageous, and in particular a wind turbine system with improved stability during service of the wind turbine system.

SUMMARY OF THE INVENTION

It may be seen as an object of the present invention to provide a wind turbine system that solves the above mentioned problems with stability during service of the wind turbine system.

The above described object is intended to be obtained in a first aspect of the invention by providing a wind turbine system, wherein the wind turbine system is comprising:
  a support structure,
  a plurality of wind turbine modules mounted to the support structure wherein each of the plurality of wind turbine modules comprises a rotor,
  a control system,
  wherein the control system is arranged to enter a service mode wherein service can be performed in the wind turbine system, the service mode comprising:
    applying a first control command (1CC) to a first subset of wind turbine modules for terminating power production, and
    applying a second control command (2CC) to a second subset of wind turbine modules being different from said first subset of wind turbine modules, the second control command (2CC) bringing the second subset of wind turbine modules into a damping mode where each of the wind turbine modules of the second subset is operated to damp vibrations of at least one wind turbine module of the first subset of wind turbine modules.

The invention is particularly, but not exclusively, advantageous for obtaining a wind turbine system which may enable an improved and/or cost-effective way of stabilizing a wind turbine system with multiple rotors during service because of the advantageous use of the second subset of wind turbine modules for damping during service of at least one of the wind turbine modules from the first subset of wind turbine modules. This opens up for much improved stability of such wind turbine system with multiple rotors during service, the stability being provided in manner not possible in conventional single wind turbines of the HAWT-type.

In turn, the present invention thereby facilitates new and advantageous designs of especially the support structure of such wind turbine systems with multiple rotors hitherto not conceivable in practical implementation, especially the possibility of performing service under wind conditions not considered at all possible previously. It is therefore expected that the present invention will be an important element in the actual operation of wind turbine systems with multiple rotors on a larger scale. It also worth emphasizing that the present invention can be implemented with a relatively low degree of complexity, which is important for wind turbine systems with multiple rotors providing a very cost-effective path of wind energy, inter alia due to the expected use of well-tested and mature wind turbine technology in the wind turbine modules in the wind turbine systems with multiple rotors.

With respect to the term 'service', it is to be understood in the broadest sense of the word, including in a non-limiting way operations and/or procedures related to maintainability, reliability, and/or availability of the wind turbine system, or parts thereof or parts therein. Service is often used interchangeably, or synonymously, with 'maintenance', though there may be differences in the definitions. It should be noted that service within the field of wind turbines has now matured into an independent technical branch or field of business, the elements of the service being related to in-depth knowledge of the technology, related logistics, probability/statistics about failures, economical elements of the technology, etc.

It is further to be understood that in some cases, one, or more, of the wind turbine modules being serviced may—as a result of the service—be removed from, or replaced in, the wind turbine system, and thereby no longer be part of the wind turbine system as such.

With respect to the term 'vibrations', it is to be understood that vibrations are generally speaking a mechanical phenomenon whereby oscillations occur about an equilibrium point. The oscillations may be periodic, such as the motion of a pendulum, or the oscillations may be random. Oscillations may also be described as free oscillations or forced oscillations as it is well known from vibration analysis in mechanics. With respect to the related term 'damping' of vibrations or oscillations, it is to be understood to include at least reducing, restricting and/or preventing of such vibrations or oscillations. In many physical systems, damping is produced by operations and/or processes that dissipate the energy stored in the oscillation, either passively or actively.

With respect to the concept of a 'control system', it is typically implemented by electronic means, e.g. in a dedicated computer system with corresponding inputs, typically from sensors and/or models or simulations, and resulting outputs to achieve and enforce control of the vibrations according to the present invention, but it may also be implemented mechanically in relatively non-complex systems. In a passive vibration damping implementation of the present invention, the control system is however not necessarily dependent on sensor input with vibration data, because suitable passive damping positions and/or operation parameters may be sufficient to implement the present invention as it will be discussed in more detail below.

By 'each of the wind turbine modules of the second subset is operated to damp vibrations of at least one wind turbine module of the first subset of wind turbine modules' may for example be understood that each of the wind turbine modules of the second subset is operated to actively damp vibrations of at least one wind turbine module of the first subset of wind turbine modules based on vibration data,
wherein the wind turbine system comprises one, or more, vibration sensors positioned on, or near, said at least one wind turbine module of the first subset of wind turbine modules where vibrations are to be actively dampened, the one, or more vibration sensors providing vibration data to the control system, the control system having a control loop, such as a closed control loop, for performing active damping on said at least one wind turbine module based on said vibration data,
wherein the second control command (2CC) is arranged for any one or more of
pitching blades on the rotors,
enabling torque control of the rotors, and/or
enabling power control of corresponding generators connected to the rotors,
in, at least part of, the second subset of wind turbine modules, so as to actively damp vibrations of said at least one wind turbine module of the first subset of wind turbine modules
and/or wherein
the second control command is arranged for bringing the second subset of wind turbine modules into a passive damping mode where each of the wind turbine modules of the second subset is positioned and/or operated to passively damp vibrations of at least one wind turbine module of the first subset of wind turbine modules,
wherein the second control command is arranged for bringing the second subset of wind turbine modules into the passive damping mode by modifying the eigenfrequencies and/or modal parameters of the wind turbine system by positioning and/or operating the second subset of wind turbine modules accordingly.

By 'actively damp vibrations' may be understood applying a force (such as via pitching, torque control and/or power control), such as a moment (for example via having the second subset of wind turbine modules pitching back and forth, preferably in antiphase with the vibration to be dampened), which force counteracts the vibration.

By 'passive damping' may be understood that the second control command can bring the wind turbine system into relative positions, such as a 'sweet spot' of relative positions, within the wind turbine system, such as wherein one or more eigenfrequencies relevant to the vibration to be dampened are moved away (spectrally) from one or more frequencies of applied forces (such as a rotor frequency).

In some embodiments, the second control command (2CC) is arranged for bringing the second subset of wind turbine modules into an active damping mode where each of the wind turbine modules of the second subset may be operated to actively damp vibrations of at least one wind turbine module of the first subset of wind turbine modules based on vibration data. More specifically, the wind turbine system may comprise one, or more, vibration sensors positioned on, or near, said at least one wind turbine module of the first subset of wind turbine modules where vibrations are to be actively dampen, the one, or more vibration sensors providing vibration data to the control system, the control system having a control loop for performing active damping on said at least one wind turbine module based on said vibration data. In this way, a very effective way of achieving vibration damping may be obtained, beneficially the vibration damping may be closely integrated with the design of the wind turbine system and/or the external parameter of the system, typically advancing the design limits of the wind turbine system significantly.

In other embodiments, the second control command (2CC) is arranged for bringing the second subset of wind turbine modules into a passive damping mode where each of the wind turbine modules of the second subset is positioned and/or operated to passively damp vibrations of at least one wind turbine module of the first subset of wind turbine. In this way, a quite cost-effective and simple way of achieving vibration damping may be obtained without the need for continuous data collection and analysis in the control system. Instead, the second control command can bring the wind turbine system into a 'sweet spot' of relative positions within the wind turbine system and/or suitable operation parameter of the wind turbine system, possibly subject to some external parameters, e.g. wind speed and direction. Thus, the second control command may be arranged for bringing the second subset of wind turbine modules into a passive damping mode by modifying the eigenfrequencies and/or modal parameters of the wind turbine system by positioning and/or operating the second subset of wind turbine modules accordingly.

In advantageous embodiments, the control system may be arranged for actively and/or passively dampen vibrations associated with one, or more, vibration modes in the support structure and/or vibrations associated with one, or more, vibrations modes of the rotors in the plurality of wind turbine modules, thus in some embodiments both active and passive damping of vibrations, or oscillations, is implemented in the wind turbine system for significantly improved stability.

In a second aspect, the invention relates to a method for bringing a wind turbine system into a service mode, the wind turbine system comprising:
a support structure,
a plurality of wind turbine modules mounted to the support structure wherein each of the plurality of wind turbine modules comprises a rotor,
a control system,
wherein the method comprising:

applying a first control command (1CC) to a first subset of wind turbine modules for terminating power production, and applying a second control command (2CC) to a second subset of wind turbine modules being different from said first subset of wind turbine modules, the second control command (2CC) bringing the second subset of wind turbine modules into a damping mode where each of the wind turbine modules of the second subset is operated to damp vibrations of at least one wind turbine module of the first subset of wind turbine modules.

In a third aspect, the invention relates to a computer program product having instructions which, when executed cause a computing device or a computing system, such as a control system, to perform a method according the second aspect.

In a fourth aspect, the invention relates to control system for controlling a wind turbine system, said control system being arranged for controlling said wind turbine system according to a method according to the second aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1A:
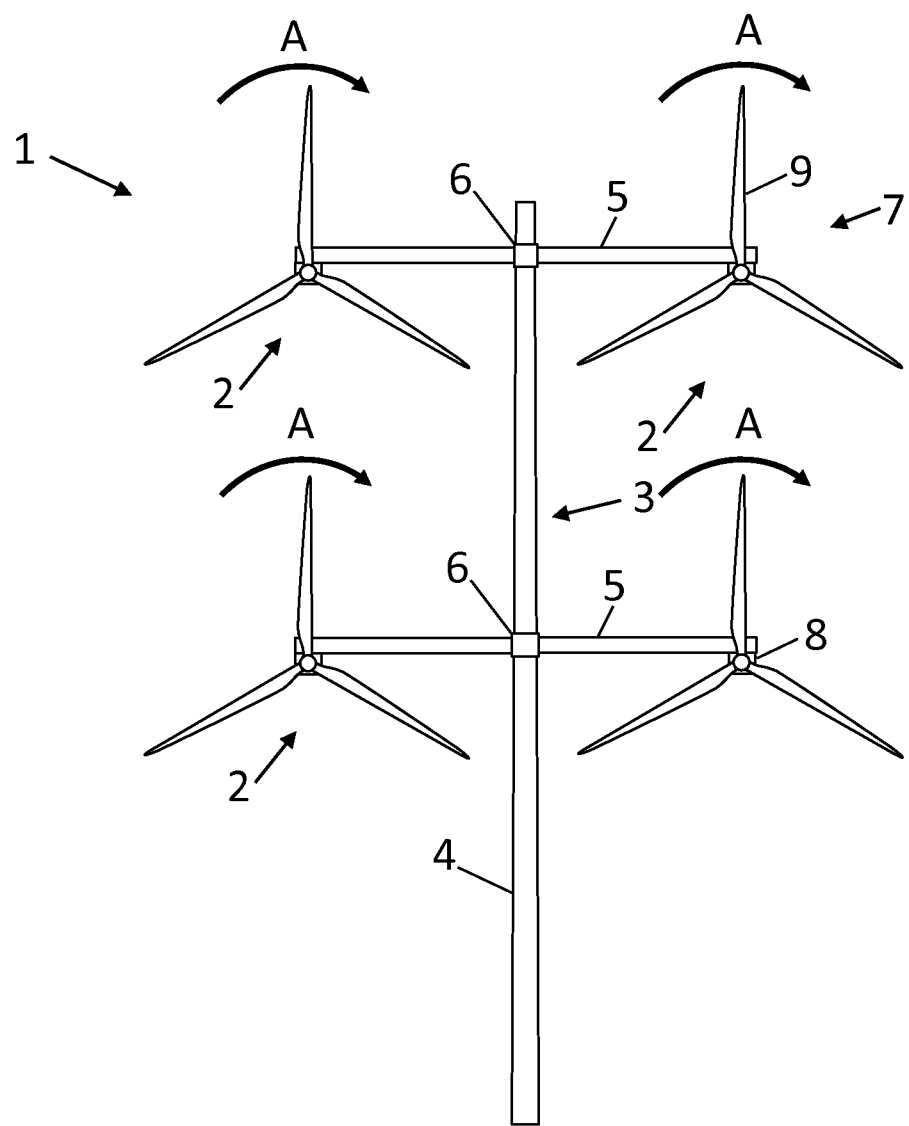
FIG. 1 depicts a wind turbine system according to the present invention.

FIG. 1A depicts a wind turbine system 1, wherein the wind turbine system is comprising:

a support structure 3 including a tower 4 and arms 5 mounted to the tower 4 at junctions 6, a plurality of wind turbine modules 2 mounted to the support structure 3 wherein each of the plurality of wind turbine modules comprises a rotor 7 with blades 9.

Figure 2:
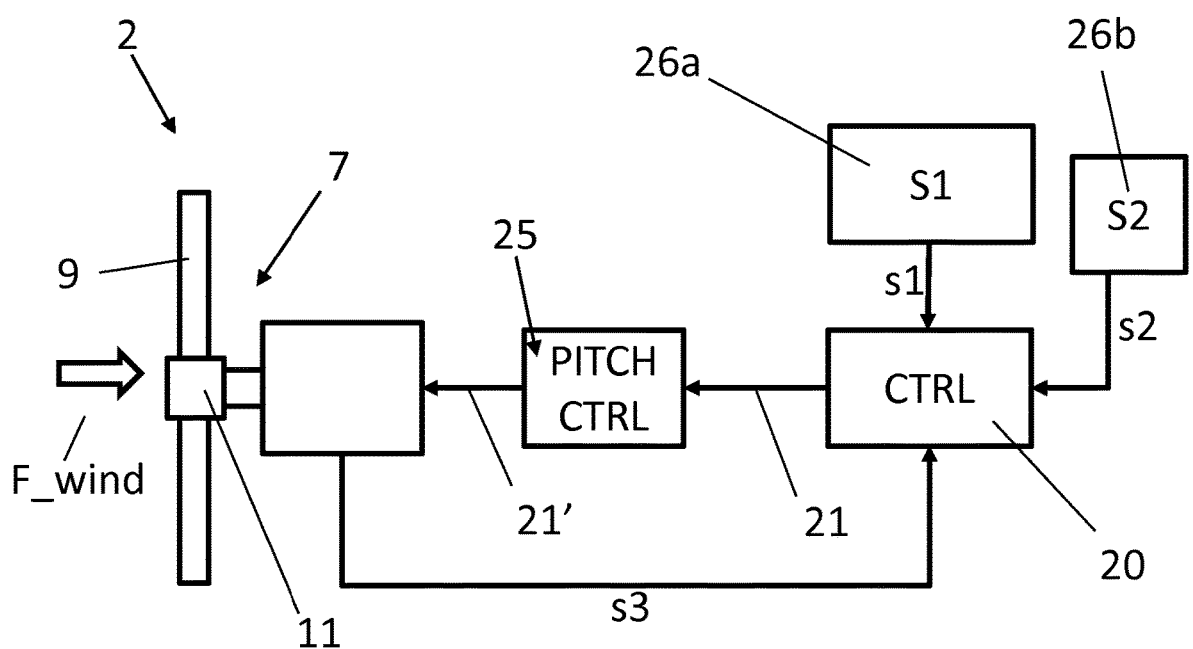
FIG. 2 shows a part of a wind turbine system according to the present invention.

The wind turbine system further comprises a control system 20 as shown in FIG. 2 as described further below. The control system 20 is arranged to enter a service mode by executing a number of control commands according to the present invention.

In the present embodiment, the support structure 3 comprises arms 5 extending outwards from the tower 4, each of the plurality of wind turbines modules being mounted on an end part of a corresponding arm. Furthermore, FIG. 1A depicts a nacelle 8 for each wind turbine module 2. FIG. 1A shows a support structure with two arms 5 each having two wind turbine modules 2 mounted thereon, but other embodiments are of course conceivable, e.g., four arms with four wind turbine modules each or three arms with lower, middle and upper arm, respectively having six, four and two wind turbine modules. The wind turbine modules may be in the same vertical plane, or they may be shifted relative to each other.

In the wind turbine modules 2, the kinetic energy of the wind is converted into electrical energy by a power generation system (not shown), as it will be readily understood by a person skilled in wind turbines. As indicated by the four arrows A in FIG. 1A the rotors are rotating, and the wind turbine modules 2 are thus all operational and producing power from the wind, i.e. the wind turbine system is not in a service mode.

Figure 1B:
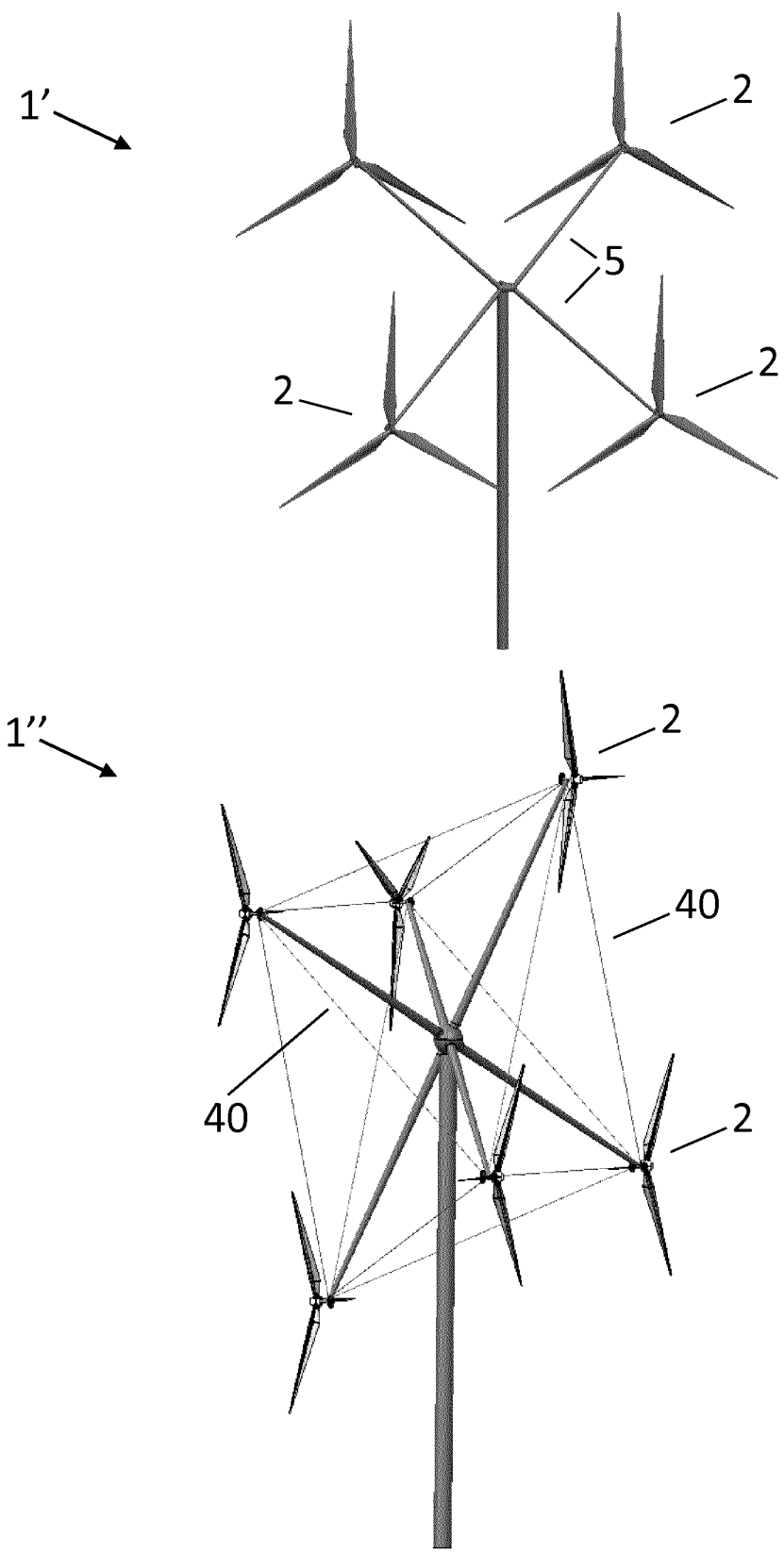

In FIG. 1B, some other embodiments of a wind turbine system 1' and 1" according to the invention are shown, but other embodiments are of course conceivable, e.g., four arms with four wind turbine modules each or three arms with lower, middle and upper arm, respectively having six, four and two wind turbine modules. Also higher numbers of wind turbine modules are contemplated within the teaching and principle of the present invention, e.g. 7, 8, 9, 10, 11, 12, 13, 14, 15, 16, 17, 18, 19 or 20 etc. wind turbine modules may be mounted on a support structure in various design configurations.

In the upper wind turbine system 1' in FIG. 1B, four arms 5 are extending from a common junction on the tower in substantially the same vertical plane, two arms pointing upwards and two arms pointing downwards from the junction.

The wind turbine modules may be in the same vertical plane, or they may be shifted in the wind direction relative to each other as for example with the lower wind turbine system 1". Thus, in the wind turbine system 1" six arms are extending from a common junction on the tower, tree arms pointing forward relative to junction and three arm pointing backwards from the junction. As schematically shown the wind turbine modules 2 may—in addition to arms—be mechanically supported by connecting means 40 directly between the wind turbine modules 2 for increased stability, e.g. by using wires, rods, bars, or similar.

Figure 1C:
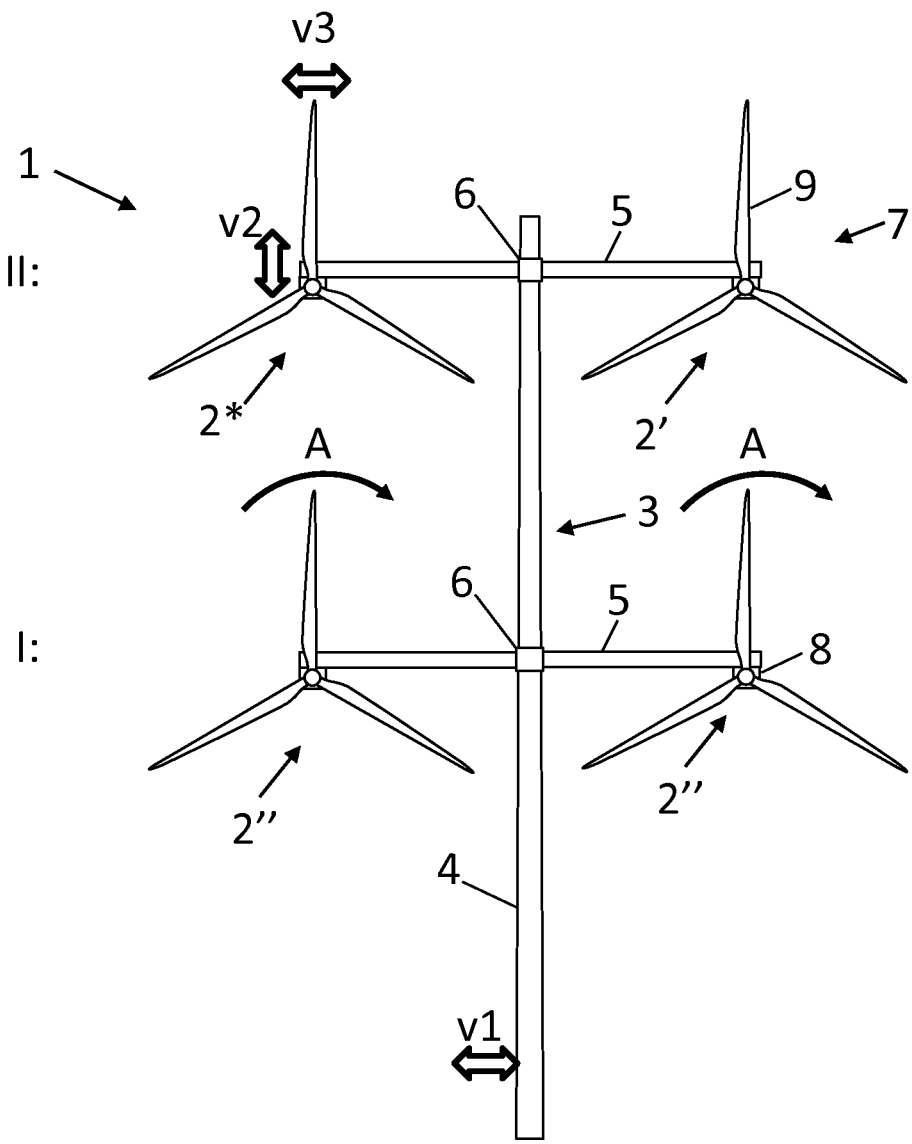

FIG. 1C shows a support structure 3 similar to FIG. 1A with two transverse arms 5 on the tower 4, each arm having two wind turbine modules 2 mounted thereon in a lower level I and an upper level II. In FIG. 1C, the two upper wind turbines modules 2' and 2\* constitute a first subset of wind turbine modules which have received a first control command 1CC for terminating their power production so that service made be performed on wind turbine module 2\* in a service mode of the wind turbine system 1, and hence the two rotors 7 at level I are not rotating. Thus, for service personal (not shown) it is now possible to access the wind turbine module 2\* for service and/or maintenance, which may be planned or urgently needed.

During the service mode where service made be performed at the specific wind turbine module 2* from the first subset of wind turbine modules, there is applied a second control command 2CC to a second subset of wind turbine modules 2" at level I, i.e. being different from the first subset of wind turbine modules at level II. The second control command 2CC brings the second subset of wind turbine modules 2" into a damping mode where each of the wind turbine modules of the second subset is operated to damp vibrations of the wind turbine module 2* of the first subset of wind turbine modules.

In this embodiment, the first and the second subset of wind turbine modules are positioned at different vertical levels on the support structure, here respectively level II and I, but in other embodiments some, or all, of the first and second subset of wind turbine modules may be positioned at the same vertical level, e.g. on common arm of the support structure or similar.

In the wind turbine system 1 according to the present invention, vibrations may be associated with one, or more, vibration modes in the support structure, e.g. tower vibrations v1 (side-side, fore-aft etc.), or arm vibrations v2, and/or vibrations associated with one, or more, vibrations modes v3 of the rotors 7 in the wind turbine modules 2 as schematically indicated by the corresponding three double arrows. Thus, from wind turbines in general, it is know that with a plurality of blades on a rotor, e.g. 3 blades, there will normally be so-called first and second order symmetric and asymmetric vibration modes, and possibly others, present for the blades.

The various vibrations modes are advantageously damped by the present invention either actively or passively. Possibly, the damping can be performed by a combination of the two ways of handling vibrations in the wind turbine system 1.

When implementing the present invention by active damping, the second control command 2CC is arranged for bringing the second subset of wind turbine modules 2" into an active damping mode, where each of the wind turbine modules 2" of the second subset is operated to actively damp vibrations of at least one wind turbine module (2*) of the first subset of wind turbine modules based on vibration data that is transmitted to the control system 20.

Thus, a control process, e.g. a closed control loop, may be implemented where various constraints or limits may be imposed on the control system.

Thus, the control system can be arranged to perform active damping on said at least one wind turbine module 2* from the first subset of wind turbine modules in dependency on one, or more, external parameters relative to the wind turbine system, preferably to a predefined level of vibration with respect to such external parameters, e.g. external parameters like wind (speed and/or directions), temperature, pressure, humidity etc.

Additionally or alternatively, wherein the control system can arranged to perform active damping on said at least one wind turbine module 2* from the first subset of wind turbine modules in dependency on one, or more, operation parameters of the wind turbine system, preferably to a predefined level of vibration with respect to such operation parameters, e.g. a level of vibration directly related to a a required service of the wind system, or level of vibration related another operation parameter of the wind turbine, such a power of one or more wind turbine modules while being part of the second subset, rotation speed and/or torque of rotors of one or more wind turbine modules while being part of the second subset, deviation of support structure from a certain positions, etc.

When implementing the present invention by performing passive damping of the wind turbine system 1, the second control command 2CC is arranged for bringing the second subset of wind turbine modules 2" into a passive damping mode where each of the wind turbine modules of the second subset is positioned and/or operated to passively damp vibrations of at least one wind turbine module (2*) of the first subset of wind turbine. More specifically, the passive damping mode may comprise modifying the eigen frequencies and/or modal parameters of the wind turbine system by positioning and/or operating the second subset 2" of wind turbine modules accordingly.

This can achieved in numerous ways due to the relatively many degrees of freedom in wind turbine system, where each wind turbine module can be both operated independently from each other and positioned, to a high degree, independently from each as the skilled person in mechanical properties of wind turbine systems will readily understand once teaching and general principle of the present invention is fully comprehended.

Thus, each wind turbine module 2 may be rotated (yawed) around a vertical rotational axis, and/or the arms 5, where the wind turbine modules are mounted, may be rotated (yawed) around the central tower 4 to a position for performing passive damping. Also, the blades 9 may be fixed in a certain azimuthal position for acting as a passive damper, e.g. neighbouring wind turbine modules may be fixed with opposite azimuthal blade positions relative to each other.

Likewise, each wind turbine module may be operated independently from each other, e.g. with respect to power production, pitch position of blades, number of rotations per minute (RPM), etc. In particular, it is contemplated that a low RPM of the wind turbine modules in the second subset 2" may be advantageous, a so-called idling (reduced power) mode of operation at for example 0.01-10 RPM, more preferably 0.1-1 RPM.

The wind turbine system 1 further comprises a control system CTRL 20 as schematically shown in FIG. 2 with the forces of the wind F_wind is acting on just one wind turbine module 2 for simplicity. FIG. 2 shows a part of a wind turbine system wherein the control system 20 is arranged for pitching rotor blades 9 on the rotors 7 (where each rotor 7 comprises a hub 11 which rotor blades 9 are attached to) by active damping i.e. the control system is implementing a control process, e.g. a closed control loop, where input data is used as feedback as the skilled person on control theory will readily understand. The control system 20 of the wind turbine system comprises an input arrangement, e.g. corresponding data ports and sections, for receiving vibration data, s1, s2, and s3, associated with the plurality of wind turbines modules 2 and/or the support structure 4. By way of example, in FIG. 2 the data s1 and s2 originates from sensor S1 26a and S2 26b, respectively, whereas vibration data s3 comes from the nacelle. Vibration data s1 could for example be load data from the support structure 3 obtained from suitable gauges/sensors (not shown), whereas vibration data s2 could be related vibration data from the support structure. Vibration data s3 could for example be vibration data from the rotor blades 9 (from one, more or all of them). The control system 20 and 25 is operably connected to the input arrangement for receiving vibration data, s1, s2 and s3. The control system 20 and 25 is also configured to determine commands 21 and 21' for a particular wind turbine module 2' and/or 2" of the plurality of wind turbines modules 2. The command 21' is a pitch command for pitching the rotor blade 9 to a specific pitch position a in FIG. 2. Needless to say, the control system 20 and 25 may generate commands for more than one wind turbine module 2' and 2", in particular for all of the wind turbine modules 2 in the wind turbine system 1.

The input arrangement can be operably connected to a sensor system, 26a and 26b, for measuring vibration data, s1, s2, and s3 associated with the plurality wind turbine modules and/or the support structure, preferably the sensor arrangement, 26a and 26b, comprises one, or more, sensor elements positioned on, at, or near the particular wind turbine module 2', e.g. accelerometers, vibrations sensors, gyros, position sensors, optical sensors or similar sensing means capable of yielding vibration related data. More preferably, such vibration sensor elements can be positioned on, or at, the rotor blades 9 of the wind turbine modules 2, and/or the support structure 3 and tower 4, possibly outside or below the support structure, e.g. optical sensors measuring vibration at a distance from a ground position.

Thus, the wind turbine system may further comprises one, or more, vibration sensors 26 positioned on, or near, said arms 5 extending from the support structure, the one, or more vibration sensors on the arms providing vibration data s1, s2, and s3 to the control system, the control system having a control loop for performing active damping related to one, or more, vibration modes v2 associated with the vibration of the arms v2 based on said vibration data.

Figure 3:
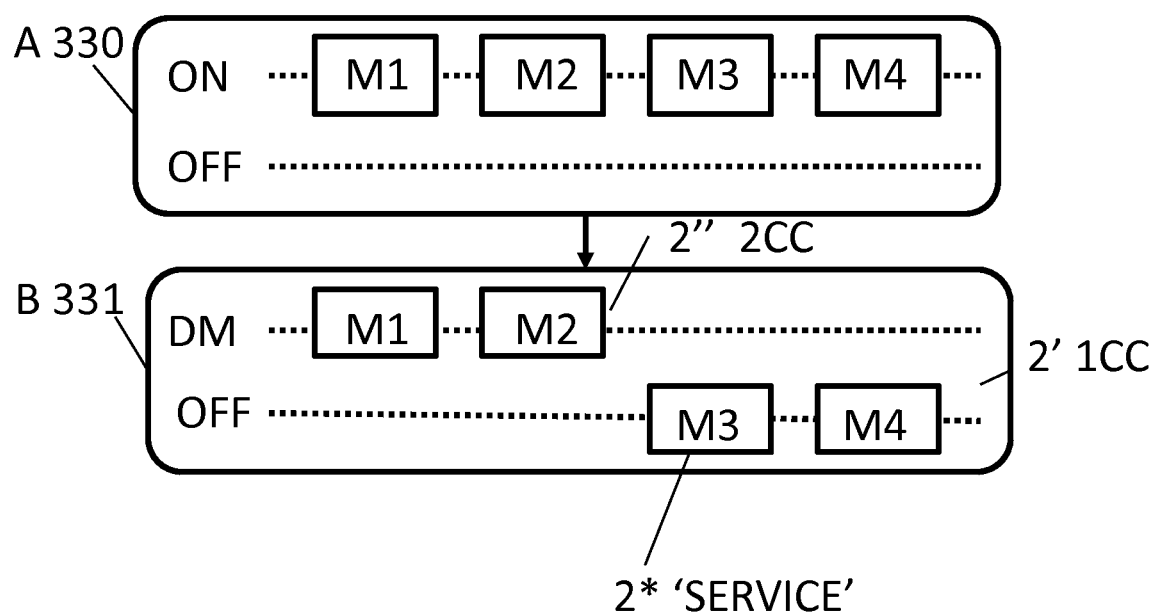
FIG. 3 shows a method for bring the wind turbine system into a service mode according to the present invention.

FIG. 3 schematically shows a method for bring a wind turbine system with four wind turbines, M1, M2, M3, and M4 into a service mode. The four modules may be arranged in any suitable way on a support structure, e.g. like in FIGS. 1A and 1C, but the skilled person would of course readily understand that the illustrated principle of the present is not limited to this specific embodiment.

In step A 330, the wind turbines M1-M4 are all producing power 'ON', and the wind turbine system is not in a service mode yet. In step B 331, the service mode is entered, and hence the first control command 1CC stops the power production from the modules M3 and M4, 'OFF'. In step B 331, simultaneously, before or after the application of the first control command 1CC, the second control command 2CC is executed so as to bring modules M1 and M2 (forming the second subset 2") into a damping mode 'DM', where modules M1 and M2 are providing damping, actively and/or passively as described above, to at least the wind turbine module M3 2*, which can then be serviced and/or maintained by service personnel and/or service equipment (e.g. cranes, remotely operated drones or robots, etc.). The modules M3 and M4 may be considered to form the first subset 2' in the illustrated embodiment. It is to be understood that vibrations may of course also be dampen in module M4 not under service in FIG. 3. Possibly, module M4 may be up for service after module M3 has finished service.

Figure 4:
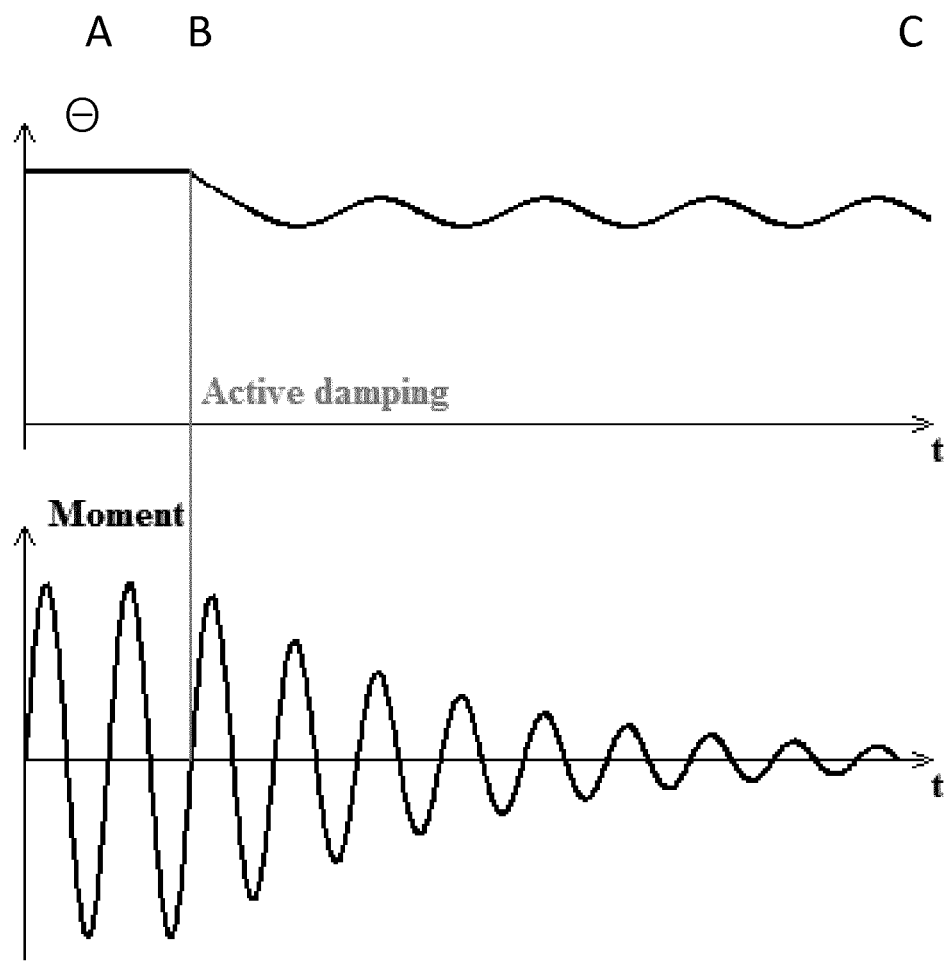
FIG. 4 is a graph showing active vibration damping using pitching of a rotor blade of a wind turbine module.

FIG. 4 is a graph showing active vibration damping with pitching of a rotor blade 9 of a wind turbine module 2" as for example implemented by the control system of FIG. 2 with reference to the two steps A and B of FIG. 3. Thus in step A in time, the pitch angle θ of one (or more) blades in the upper part of the graph shows how the pitch angle is constant in a production mode. In step B in time, the pitch angle θ is systematically varied to actively damp a bending Moment at, or near, the wind turbine module 2*, which is to be serviced. During step B, it is evident that the active damping from the second subset of wind turbine modules 2" pitching back and forth, preferably in antiphase with the vibration to be dampen, gradually reduces the Moment until a point in time step C, where service is then possible, either because the Moment is reduced to zero or near-zero, or because the Moment has been reduced to a certain level, where service of wind turbine module 2* is feasible.

As an alternative to pitching, the second control command 2CC can be arranged for enabling torque control of the rotors 7 in, at least part of, the second subset of wind turbine modules 2" so as to actively damp vibrations of at least one wind turbine module 2* of the first subset of wind turbine modules. In another alternative, the second control command 2CC may be arranged for enabling power control of corresponding generators connected to the rotors 7 in, at least part of, the second subset of wind turbine modules 2" so as to actively damp vibrations of at least one wind turbine module 2* of the first subset of wind turbine modules.

Figure 5:
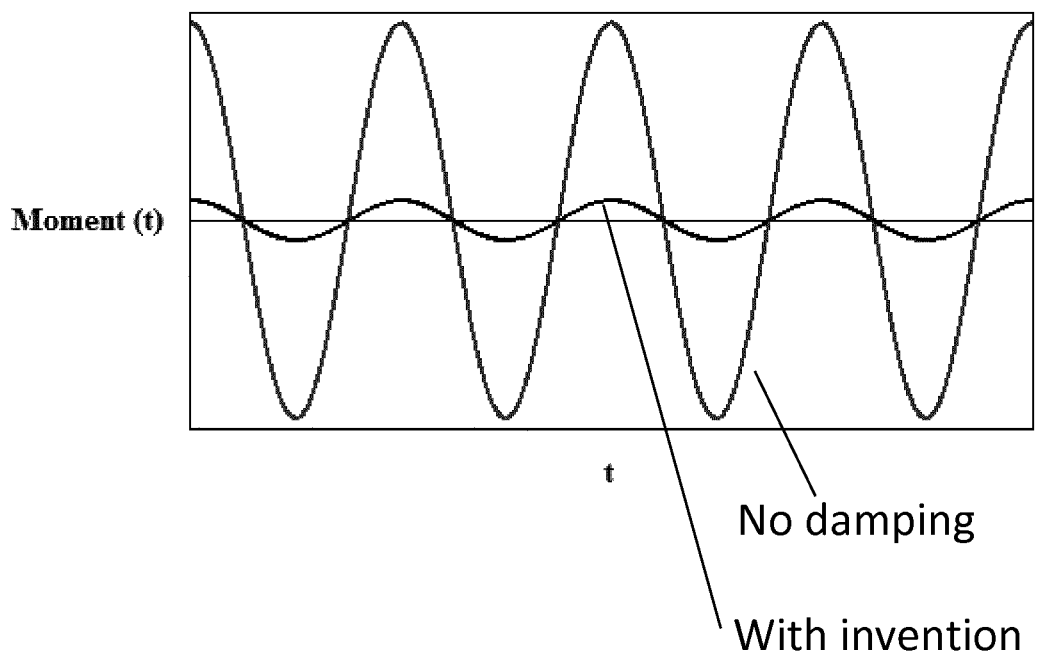
FIG. 5 is a graph showing the moment in two different situations.

FIG. 5 is a simulation showing the Moment in two different situations similar to the lower part of the graph in FIG. 4, respectively with and without damping according to the present invention. Thus, FIG. 5 shows the periodic Moment of a wind turbine module 2* to be serviced is oscillating back and forth between two extremes, but with damping according to the present invention the periodic Moment is significantly reduced to lower level in amplitude i.e. to a level where service is possible or more safe to initiate.

Figure 6:
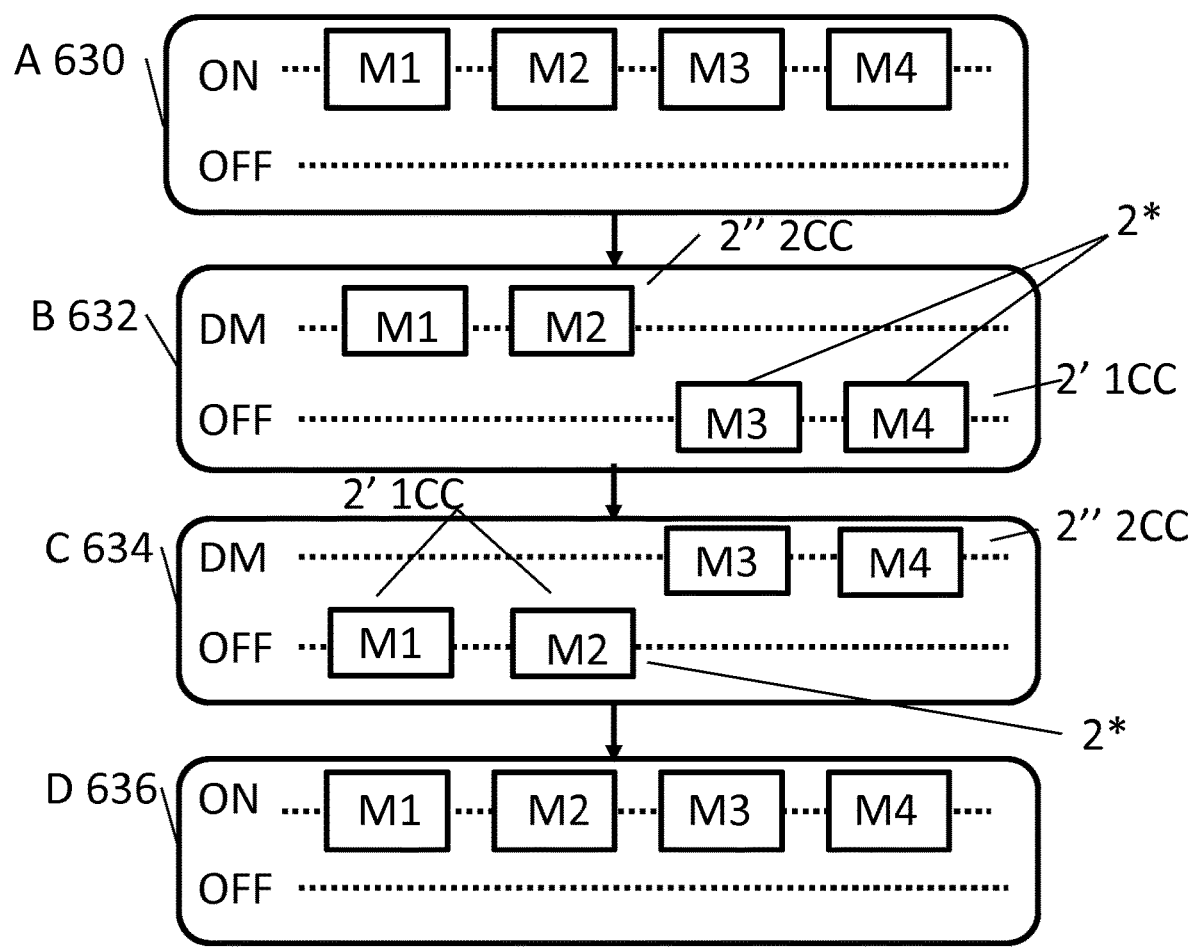
FIG. 6 shows another method for bringing a wind turbine system into a service mode two times according to the present invention.

FIG. 6 shows another method for bringing the wind turbine system into a service mode two times similar to FIG. 3. Thus, FIG. 6 schematically shows a method for bring a wind turbine system with four wind turbines, M1, M2, M3, and M4 into a service mode two times, but it may readily be generalized for higher number of wind turbine modules and/or more complex structures of wind turbine systems. The four modules may be arranged in any suitable way on a support structure, e.g. like in FIGS. 1A and 1C, but the skilled person would of course readily understand that the illustrated principle of the present is not limited to this specific embodiment.

In step A 630, the wind turbines M1-M4 are all producing power 'ON', and the wind turbine system is not in a service mode yet.

In step B 631, the service mode is entered, and hence the first control command 1CC stops the power production from the modules M3 and M4, 'OFF'. In step B 331, simultaneously, before or after the application of the first control command 1CC, the second control command 2CC is executed so as to bring modules M1 and M2 (forming the second subset 2") into a damping mode 'DM', where modules M1 and M2 are providing damping, actively and/or passively as described above, to at least the wind turbine modules M3 and M4 2*, which can then be serviced and/or maintained by service personnel and/or service equipment. The modules M3 and M4 may now be considered to form the first subset 2' in the illustrated embodiment.

In step C 631, the service mode is entered again, but this time the first control command 1CC stops the power production from the modules M1 and M2, where module M2 2* is to be serviced. The modules M1 and M2 now forms another first subset 2'. Because modules M3 and M3 already have been serviced in step B, the second control command 2CC is now applied to modules M3 and M4 (now forming another second subset 2") to bring them into a damping mode 'DM', where these two modules can dampen vibrations at module M2 2* while service is then performed on this module. Thus, it is now modules M1 and M2, which may now be considered to form the first subset 2' in the illustrated embodiment.

In step D 636, all four modules M1-M4 may be brought back into power production 'ON', where service in steps B, and C, have been performed on M3 and M4, and M2, respectively.

Figure 7A:
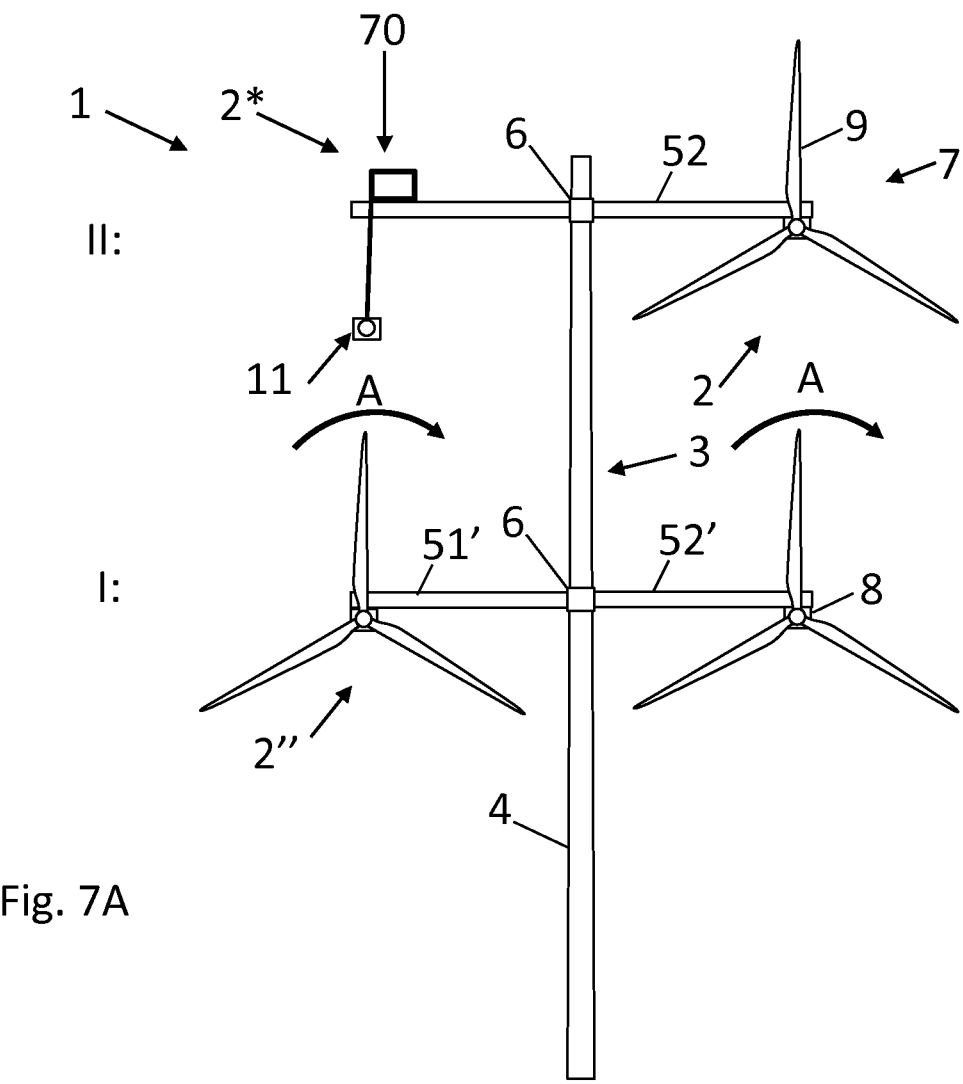
FIG. 7 depicts a wind turbine system under service according to the present invention.
Figure 7B:
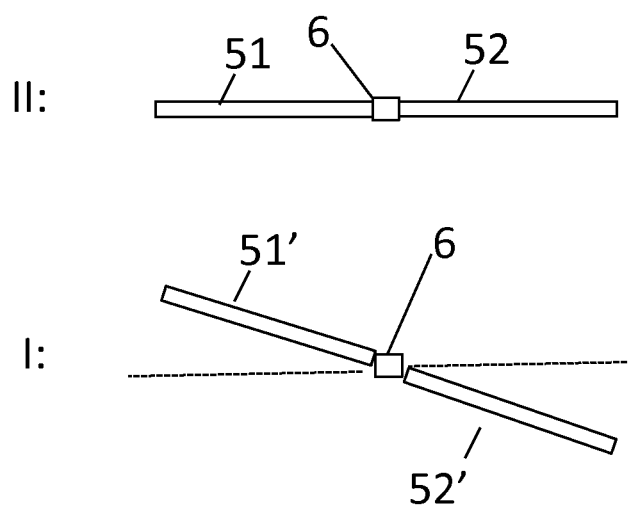

FIG. 7 depicts a wind turbine system 1 under service according to the present invention similar to system shown in FIG. 1C. FIG. 7A is front view similar to the view in FIG. 1C, and FIG. 7B is a partial top view illustrating how the arms may rotate around the tower 4. In FIG. 7, the wind turbine module 2* at level II is removed i.e. a crane 70 is lowering the nacelle 11 from the previous position on the support structure. During the service, the wind turbine modules 2" at level I are then in a damping mode so as to lower vibrations at the wind turbine module 2*.

The support structure 3 thus comprises arms, 51' and 52' at level I, and 51 and 52 at level II, extending outwards from the tower 4, each of the plurality of wind turbine modules 2 being mounted on a part of a corresponding arm, the one, or more, arms being pivotably arranged on the tower. The second command 2CC from the control system (not shown here, cf. FIG. 2) is correspondingly arranged for enabling rotation of said one, or more, pivotably arranged arms around the tower during said service mode of the wind turbine system so that an advantageous position for both active and/or passive vibration damping can be taken be the arms and the wind turbine modules mounted thereon.

In some embodiments, the rotation of said one, or more, arms around the tower during service of the wind turbine system can be provided from a positive thrust and/or a negative thrust from corresponding wind turbine modules 2" for rotation around the tower, thus the wind turbine modules can be rotated with help from the wind turbine modules, e.g. the arm of the lower level I can be rotated (yawed) out of the lowering line from the crane 70 to avoid collision with the nacelle 11 and the lower lying arms 51' and 52' and wind turbine modules 2". In this embodiment, the arms 51' and 52' at level I are rotated as one element, both they could be independently rotatable around the tower 4. In some embodiments, the negative thrust may result from operating one, or more, corresponding wind turbine modules 2" from the second subset of wind turbine modules in a motor mode. This can be generally be done by operating the corresponding wind turbine module in a motor (with normal rotation direction) with a positive pitch angle θ, or it can be done by operating the corresponding wind turbine module in a motor (with opposite rotation direction) but with a negative pitch angle θ.

In other embodiments, two, or more, arms, e.g. 51' and 52' relative to each other, or 51' and 52' with respect to 51 and 52, may be kept with a substantially predefined angular separation relative to each other during the service of the wind turbine system, e.g. by providing positive thrust and/or a negative thrust from the corresponding wind turbine modules mounted on the two, or more, arms. In one example, the arms may rotate (yaw) around the tower structure so that both arms and wind turbine modules can yaw out of direct wind for reducing the direct impact of the wind and possibly thereby inducing vibrations in the wind turbine system.

Figure 8:
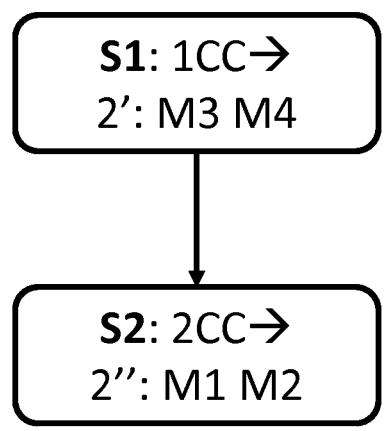
FIG. 8 is a flow chart for illustrating a method according to the present invention.

FIG. 8 is a flow chart for illustrating a method according to the present invention. A method for bringing a wind turbine system into a service mode, the wind turbine system 1 comprising, cf. FIGS. 1A, 1B, and 1C:
a support structure 3,
a plurality of wind turbine modules 2 mounted to the support structure 3 wherein each of the plurality of wind turbine modules comprises a rotor 7,
a control system 20, cf. FIG. 2,
wherein the method comprises, simultaneously (wholly or partly) or consecutively (in both orders), the steps of:
S1 applying a first control command 1CC to a first subset of wind turbine modules 2' M3 and M4 for terminating power production, cf. FIGS. 3 and 6, and
S2 applying a second control command 2CC to a second subset of wind turbine modules 2" M1 and M2 being different from said first subset of wind turbine modules, the second control command 2CC bringing the second subset of wind turbine modules 2" into a damping mode, cf. FIGS. 3 and 6, where each of the wind turbine modules of the second subset is operated to damp vibrations of at least one wind turbine module 2* of the first subset of wind turbine modules cf. FIG. 1C.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine system, wherein the wind turbine system comprises:
a support structure;
a plurality of wind turbine modules mounted to the support structure wherein each of the plurality of wind turbine modules comprises a rotor; and
a control system, wherein the control system is arranged to enter a service mode wherein service can be performed in the wind turbine system, the service mode comprising:
applying a first control command to a first subset of wind turbine modules for terminating power production, and
applying a second control command to a second subset of wind turbine modules being different from said first subset of wind turbine modules, the second control command bringing the second subset of wind turbine modules into a damping mode where each of the second subset of wind turbine modules is operated to damp vibrations of at least one wind turbine module of the first subset of wind turbine modules.

2. The wind turbine system according to claim 1, wherein the second control command is configured for bringing the second subset of wind turbine modules into an active damping mode where each of the wind turbine modules of the second subset is operated to actively damp vibrations of at least one wind turbine module of the first subset of wind turbine modules based on vibration data.

3. The wind turbine system according to claim 2, wherein the wind turbine system comprises one, or more, vibration sensors positioned on, or near, said at least one wind turbine module of the first subset of wind turbine modules where vibrations are to be actively dampened, the one, or more vibration sensors providing vibration data to the control system, the control system having a control loop for performing active damping on said at least one wind turbine module based on said vibration data.

4. The wind turbine system according to claim 2, wherein the control system is configured to perform active damping on said at least one wind turbine module from the first subset of wind turbine modules in dependency on one, or more, external parameters relative to the wind turbine system, to a predefined level of vibration with respect to such external parameters.

5. The wind turbine system according to claim 2, wherein the control system is configured to perform active damping on said at least one wind turbine module from the first subset of wind turbine modules in dependency on one, or more, operation parameters of the wind turbine system, to a predefined level of vibration with respect to such operation parameters.

6. The wind turbine system according to claim 1, wherein the second control command is configured for pitching blades on the rotors in, at least part of, the second subset of wind turbine modules so as to actively damp vibrations of said at least one wind turbine module of the first subset of wind turbine modules.

7. The wind turbine system according to claim 1, wherein the second control command is configured for enabling torque control of the rotors in, at least part of, the second subset of wind turbine modules so as to actively damp vibrations of at least one wind turbine module of the first subset of wind turbine modules.

8. The wind turbine system according to claim 1, wherein the second control command is configured for enabling power control of corresponding generators connected to the rotors in, at least part of, the second subset of wind turbine modules so as to actively damp vibrations of at least one wind turbine module of the first subset of wind turbine modules.

9. The wind turbine system according to claim 1, wherein the second control command is configured for bringing the second subset of wind turbine modules into a passive damping mode where each of the wind turbine modules of the second subset is positioned or operated to passively damp vibrations of at least one wind turbine module of the first subset of wind turbine modules.

10. The wind turbine system according to claim 9, wherein the second control command is configured for bringing the second subset of wind turbine modules into a passive damping mode by modifying eigen frequencies or modal parameters of the wind turbine system by positioning or operating the second subset of wind turbine modules accordingly.

11. The wind turbine system according to claim 1, wherein the control system is configured to actively or passively dampen vibrations associated with a vibration mode in the support structure and vibrations associated with a vibration mode of the rotors in the plurality of wind turbine modules.

12. The wind turbine system according to claim 1, wherein the support structure comprises arms extending outwards from a tower, each of the plurality of wind turbine modules being mounted on a part of a corresponding arm, the arms being pivotably arranged on the tower, the second control command from the control system further being configured for enabling rotation of said pivotably arranged arms around the tower during said service mode of the wind turbine system.

13. The wind turbine system according to claim 12, wherein the rotation of said arms around the tower during service of the wind turbine system is provided from a positive thrust and/or a negative thrust from corresponding wind turbine modules for rotation around the tower, said negative thrust resulting from operating one, or more, corresponding wind turbine modules from the second subset of wind turbine modules in a motor mode.

14. The wind turbine system according to claim 12, wherein two, or more, arms are kept with a substantially predefined angular separation relative to each other during the service of the wind turbine system, by providing at least one of positive thrust and a negative thrust from corresponding wind turbine modules mounted on the two, or more, arms.

15. A method for bringing a wind turbine system into a service mode, the wind turbine system comprises:
   a support structure;
   a plurality of wind turbine modules mounted to the support structure wherein each of the plurality of wind turbine modules comprises a rotor; and
   a control system, wherein the method comprises:
      applying a first control command to a first subset of wind turbine modules for terminating power production; and
      applying a second control command to a second subset of wind turbine modules being different from said first subset of wind turbine modules, the second control command bringing the second subset of wind turbine modules into a damping mode where each of the second subset of wind turbine modules is operated to damp vibrations of at least one wind turbine module of the first subset of wind turbine modules.

16. A computer program product comprising a non-transitory computer readable medium having instructions which, when executed by one or more processors, cause a computing device or a computing system to perform an operation comprising:
   applying a first control command to a first subset of wind turbine modules for terminating power production; and
   applying a second control command to a second subset of wind turbine modules being different from said first subset of wind turbine modules, the second control command bringing the second subset of wind turbine modules into a damping mode where each of the second subset of wind turbine modules is operated to damp vibrations of at least one wind turbine module of the first subset of wind turbine modules.

* * * * *